United States Patent Office 3,233,176
Patented Feb. 1, 1966

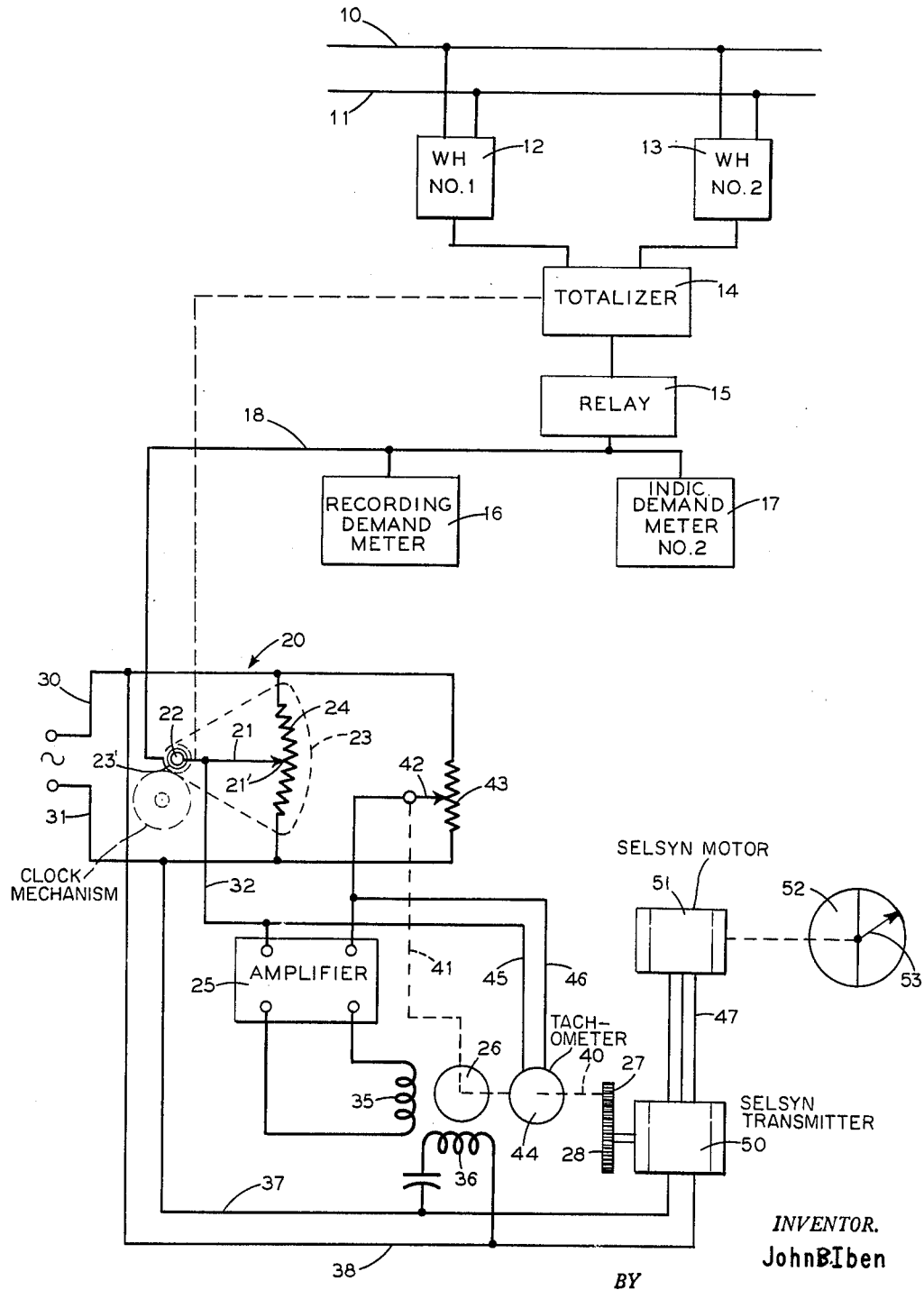

3,233,176
REMOTE POWER DEMAND INDICATOR SHOWING DIFFERENCES BETWEEN ACTUAL AND DESIRED RATES OF POWER USE
John B. Iben, Beaver Falls, Pa., assignor to The Babcock & Wilcox Company, New York, N.Y., a corporation of New Jersey
Filed Jan. 5, 1961, Ser. No. 80,808
1 Claim. (Cl. 324—103)

The present invention relates to an indicator for comparison of the actual rate of power use with a preferred rate of power use, and more particularly relates to an indicator system for showing the deviation between the actual and desired electric power use rates.

In the operation of many industrial plants, the electric power used for production is purchased at a relatively low cost per unit of electricity, with an additional demand charge which is based on the maximum actual amount of electricity used in a selected period of time. Usually, the demand charges for electric power use are based on the maximum actual amount of power used in a definite period of time, such as, for example, 15 minutes or one-half hour.

An example of industrial operation where the demand charge may be large is found in a steel melting plant wherein electric furnaces are used. Here it is possible for the actual use of power to vary widely in each increment of time on which the demand charge is based. Thus, when a 15 minute increment of time is used for purposes of determining the maximum demand charge, this charge may be established in any one of the 2880 incremental demand periods in a 30-day billing period. To operate such a plant with a minimum demand charge, it is necessary to coordinate the operations of the electric furnaces so that the actual use of power will not exceed a predetermined maximum in any one unit or increment of time.

For example, if an industrial plant ordinarily uses power at an indicated rate not exceeding 20,000 kw. for any one demand period of 15 minutes in a billing period but the actual demand rate is 25,000 kw. in only one time increment, due to some unusual set of operating conditions, the industrial user must then pay an excess demand charge for the additional 5,000 kw. in addition to the actual kwh. used. This is true even though the actual demand had never exceeded 20,000 kw. throughout the rest of the billing period of, for example, 30 days. The demand charge is usually of the order of $1.00 per kw., and under the above circumstances the power user would be required to pay an excess demand charge of $5,000 for the 5,000 kw. additional demand occurring for only 15 minutes of the billing period.

In the present invention, applicant has developed a remote demand indicator which permits electric furnace operators, or other users of electric energy, to compare the actual rate of power use with a desired rate of use at any time in a demand period so that the averaged demand rate for the demand period will not exceed the desired rate of use. At the same time, the actual use in kwh. may closely approximate the desired use rate.

The various features of novelty which characterize my invention are pointed out with particularity in the claims annexed to and forming a part of this specification. For a better understanding of the invention, its operation advantages and specific objects attained by its use, reference should be had to the accompanying drawings and descriptive matter in which I have illustrated and described a preferred embodiment of the invention.

The single figure of the drawings is a schematic representation of a power demand indicator constructed in accordance wth the present invention.

As shown in the drawing, the rate of flow of electric power to a power user through power lines such as 10 and 11, is measured by one or more watt-hour meters. In the embodiment shown, two watt-hour meters 12 and 13 are utilized. The meters make and break circuits in accordance with the rate of flow of electric power through lines 10 and 11. The impulses from the watt-hour meters are transmitted to a totalizer 14 wherein the rate of power flow as determined by watt-meters 12 and 13 is totalized. The impulse representative of the rate of power use is transmitted through amplifiers and relays 15 to a recording demand meter 16 and an indicating demand meter 17. One of the demand meters, i.e. meter 17, is constructed and arranged to operate a warning system which customarily includes lights and horns as well as automatic means for reducing power flow through the lines 10 and 11 when a selected operational power flow rate is exceeded. The operation of this system forms no part of the present invention and is not further described.

The impulses from the relay 15 which are proportional to the rate of flow of power through the lines 10 and 11 to the point of use are transmitted to a meter 20 constructed in accordance with the present invention. In this meter, a pointer 21 is rotated about a shaft 22 through an arc at an angular rate proportional with the rate of flow of power through the lines 10 and 11. A second shaft 23′ coaxial with and in telescoping relationship with the shaft 22 is attached to a pie-shaped or sector-like plate 23, moving it by means of a clock mechanism at a substantially constant angular rate through an arc of substantially 30°, during a 15 minute interval. The range regulation of pointer 21 movement relative to the rotation rate of the sector 23 is coordinated to a preset value by adjustment of the relay 15. Thus, the sector 23 rotation will be indicative of the desired rate of power use. At the end of each 15 minute interval or demand period, the sector plate 23 and shaft 23′ return to the starting position to repeat the cycle for each succeeding demand period.

As shown in the drawing, a potentiometer coil 24 is mounted on the plate 23 with the coil wound so as to form a segment of a circle centered about the axis of the shaft 23′. Thus, as the plate 23 is moved by the clock mechanism through its selected arc at a predetermined angular rate, the coil of the potentiometer 24 also moves therewith. The potentiometer coil 24 is suitably supplied with alternating current power from, for example, a 120 volt, 60 cycle source through wires 30 and 31, with the wires connected to opposite ends of the coil. The pointer 21, which is provided with a contact 21′ engages the coil 24 and is also connected with a two-stage magnetic servo-amplifier 25 of known construction by a lead wire 32. Thus, relative angular movement of the pointer 21 with respect to the coil 24, as caused by a difference between the actual and desired rates of power use, will produce a proportionate change in the voltage delivered to the amplifier 25.

The output impulses from amplifier 25 regulate the voltage supplied to the coil 35 of a two-phase motor 26. A coil 36 of the motor 26 is supplied with line voltage from the wires 30 and 31 through the wires 37 and 38, respectively, with the latter also connected with a Selsyn transmitter 50. The motor 26 thus operates in accordance with the voltage unbalance of the coils 35 and 36, with the rotation of the motor transmitted through a shaft 40 and the gears 27 and 28 to the Selsyn transmitter 50. A tachometer 44 mounted on the shaft 40 and connected through the wires 45 and 46 with the amplifier 25 feeds back electrical voltage into the control system. The potentiometer 43 and tachometer 44 serve as anti-hunt devices to stabilize the operations of the indicator system. The rotation of the motor 26 is also transmitted through a separate shaft 41 and suitable gearing (not shown) to position contact 42 on the potentiometer 43 so as to feed back an adjusted voltage into the amplifier 25.

A difference in voltage transmitted to the amplifier 25 by reason of the position of the contact 21' on the coil 24 will cause rotation of the motor 26 to position the pointer 53. Due to the mechanical connection between motor 26 and pointer 42 the latter will move on the coil 43 to substantially instantaneously compensate for the differential voltage value delivered to the amplifier and thereby stop rotation of the motor 26. However, such action can only occur during movement of motor 26 (and pointer 53), and the balancing of the voltages at the amplifier will not further change the position of the pointer 53.

The rotational movement of the Selsyn transmitter 50 electrically transmits voltage impulses through wires 47 providing a proportional rotation of a Selsyn motor 51. The motor 51 in turn rotationally positions the pointer 53 on dial 52. The pointer is so rotated by the Selsyn motor 51 such that the position of the pointer on the dial 52 will be indicative of the relationship between the actual and the desired rates of power use within a demand period.

In operation of the power demand indicator, the pointer 21 and segment 23 are automatically reset to their proper starting positions at the beginning of each demand period, with the pointer 21 positioned intermediate the ends of the potentiometer 24, so that there is an initial difference between the actual and desired power demand shown by the pointer 53, indicating that the actual demand is less than the desired rate of power use. This initial adustment permits the use of a large amount of power at the start of a demand period, if needed. Such an adjustment is particularly advantageous in the electric furnace melting of steel. It will also be understood that the initial starting positions of the coil 24 and the contact 21' must not permit the contact 21' to travel beyond either end of the coil 24. This is necessary to anticipate instances where the actual power use is unusually low and the contact 21' might then move at such a low rotational rate that the contact 21' might move beyond the end of the potentiometer coil 24.

With the indicator described, the difference between the actual and desired rates of power use will be shown by the position of the pointer 53 on the dial 52. When the pointer 53 is in the right hand half of the dial, as shown, the actual rate of power use is less than the desired rate, and more power may be used without exceeding the maximum demand rate for that particular demand period. Conversely, when the pointer 53 is in the left hand half of the dial 52, the actual rate of power use is more than the desired rate of power use and the rate of power use should be reduced. Since the position of the pointer 53 in the dial 52 shows the comparison between the averaged use of actual power with the desired use, the pointer 53 should be in its upright vertical position at the end of the demand period for optional maximum actual power use without exceeding the desired demand power use.

While in accordance with the provisions of the statutes I have illustrated and described herein the best form and mode of operation of the invention now known to me, those skilled in the art will understand that changes may be made in the form of the apparatus disclosed without departing from the spirit of the invention covered by my claim, and that certain features of my invention may sometimes be used to advantage without a corresponding use of other features.

What is claimed is:

An indicator for comparing the actual with a desired rate of electric power use comprising a meter for continuously measuring the actual rate of power use, a first shaft rotatable through an angle of rotation proportional in rate of movement to said actual power use and having a pointer thereon, a second shaft co-axially arranged on said first shaft and rotatable through a selected angular movement at a substantially uniform rate proportional to said desired power use, a first potentiometer coil mounted for rotation with said second shaft, contact means on said pointer engaging said coil to produce a voltage proportional in direction and amplitude to the difference in rotation between said first and second shafts, and means for transmitting said voltage to an indicator to show the continuous difference between said actual and desired rates of power use including an amplifier for transmitting power to a motor in accordance with said voltage, said motor being electro-mechanically connected with a remote indicator to indicate the difference between said actual and desired power use and mechanically connected with a second potentiometer, said second potentiometer being operative to transmit an equal and opposite voltage on said amplifier to compensate for the voltage transmitted to the amplifier from said first potentiometer.

References Cited by the Examiner

UNITED STATES PATENTS

| Re. 21,155 | 7/1939 | Miller | 324—103 |
|---|---|---|---|
| 1,314,471 | 8/1919 | Gow | 324—103 |
| 1,704,520 | 3/1929 | Sommer | 324—103 |
| 1,919,514 | 7/1933 | Hyslop | 324—103 |
| 2,047,727 | 7/1936 | Dueringer | 340—186 |
| 2,075,098 | 3/1937 | Dawson | 340—186 |
| 2,530,214 | 11/1950 | Vuille | 324—103 |
| 2,666,268 | 1/1954 | Kliever | 340—178 |
| 2,684,473 | 7/1954 | Shannon | 340—178 |

WALTER L. CARLSON, *Primary Examiner.*

L. MILLER ANDRUS, *Examiner.*